May 3, 1966  H. M. SCHLICKE ET AL  3,249,834
CAPACITIVE COMPONENT
Filed June 29, 1964
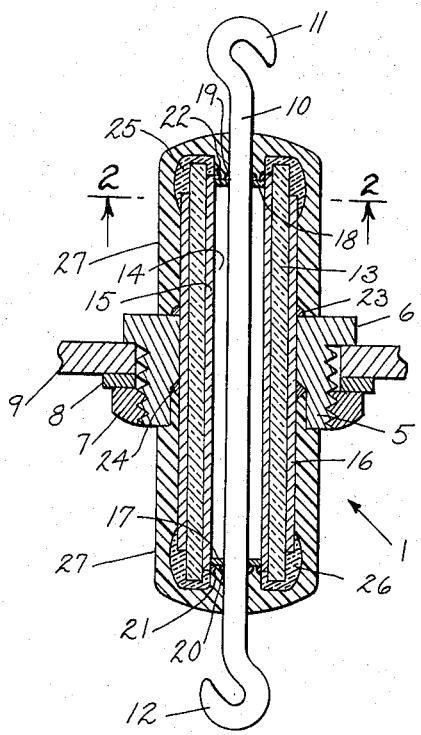
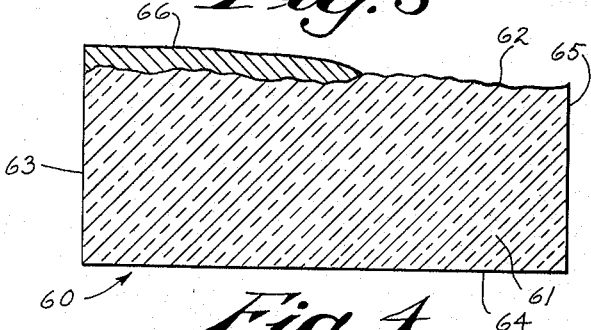
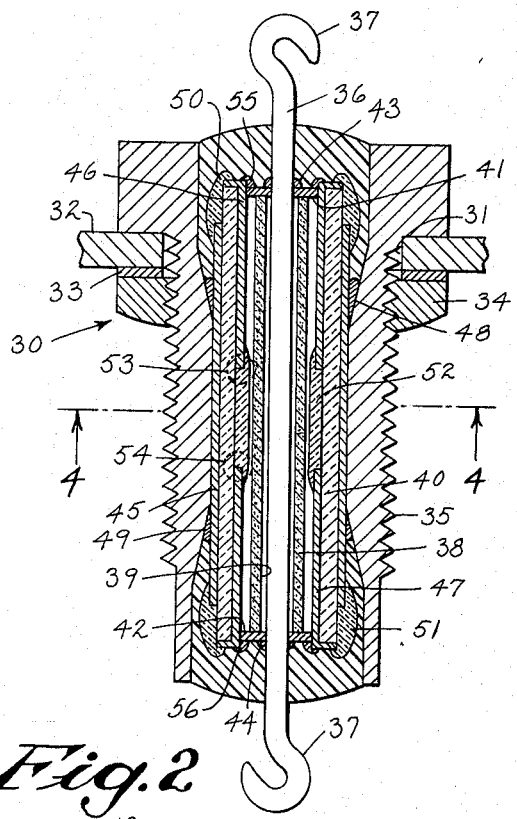
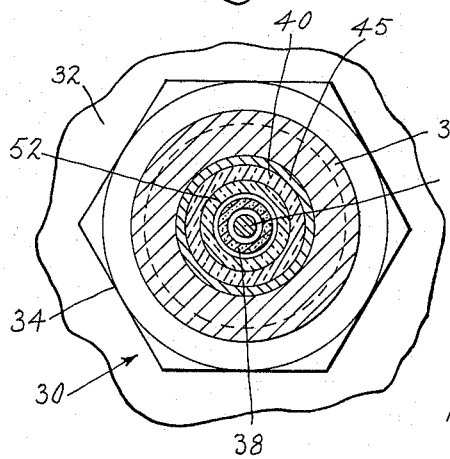
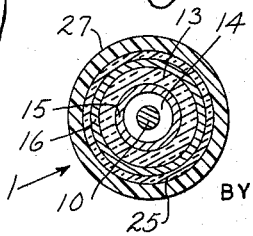
INVENTORS
HEINZ M. SCHLICKE
FLOYD A. BLOMDAHL
ALLAN A. KOUCHICH
BY
*Arnold J. Ericsen*
ATTORNEY

United States Patent Office 3,249,834
Patented May 3, 1966

3,249,834
CAPACITIVE COMPONENT
Heinz M. Schlicke, Fox Point, and Allan V. Kouchich and Floyd A. Blomdahl, Milwaukee, Wis., assignors to Allen-Bradley Company, Milwaukee, Wis., a corporation of Wisconsin
Filed June 29, 1964, Ser. No. 378,767
8 Claims. (Cl. 317—258)

This invention relates to electrical components; and it more particularly resides in an improved capacitive component having a ceramic dielectric of which one surface has intimately dispersed thereon one or more conductive electrodes in capacitive relationship with one or more conductive electrodes on the opposing surface. According to the principles of this invention, the exposed surfaces between the electrodes are treated with a high impedance adsorbent material having a dielectric constant greater than that of air whereby premature creation of corona discharge, which has plagued previous unit, is overcome.

The use of ceramic dielectrics, such as those having a titanate base material, are well known to the capacitive component industry. Their popularity stems from a high dielectric constant which makes them capable of withstanding high voltages.

Illustrative of the popularity of ceramic dielectric materials in capacitive components, is their wide use in feed-through capacitors and filters. Feed-through capacitors and filters are frequently used in circuits where it is desirable to transmit a low frequency signal from one circuit to another while at the same time removing high frequency interference signals. Feed-through capacitive components heretofore available have proven adequate for the majority of uses. However, with the rapid developments in very high and ultra-high frequency electronic circuitry a great deal of sensitive and sophisticated equipment has resulted. The equipment frequently demands capacitive components capable of withstanding voltages considerably higher than could be reliably withstood by previous units.

Though feed-through components heretofore available are capable of withstanding voltages of substantial magnitude, their high voltage reliability and applicability has been limited by the age-old problem of corona discharge. The corona discharge phenomenon arises from the fact that when the potential difference between opposing electrodes attains a magnitude such that the electric stress in any region of the dielectric is greater than the electric strength of the dielectric material, or the ambient dielectric, a discharge of electricity occurs. In any dielectric there is a certain voltage at which corona discharge occurs; however, based on the value of the dielectric constant, corona discharge occurs prematurely in ceramic feed-through components heretofore available. It is believed that this results from the fact that conventionally prepared ceramic dielectrics have microscopically foraminous surfaces comprising cavities, crevices, microscopic cracks and other irregularities into which air and moisture penetrate. The electrical field between opposing electrodes and passing through the dielectric tends to concentrate at the sharp edges of the irregularities. Also, the ambient air and moisture have a dielectric constant substantially lower than that of the ceramic. The combination of these two factors results in a premature discharge of electricity from the sharp edges to the surrounding atmosphere, while the intensity of the electrical field at other parts of the ceramic is far below the discharge point.

Though it is possible to produce ceramic dielectrics with relatively smooth surfaces, smooth surfaces are undesirable in capacitive components due to their inability to intimately bond with electrode materials. Consequently, it is necessary that the ceramic surface be somewhat foraminous so as to permit an intimate bond between the ceramic and the applied electrodes. The air and moisture within the irregularities of the surface area on which the electrodes are disposed poses no problem. When the electrodes are fired or plated on the surface—as is the common practice—the air and moisture is removed. The molten electrode material flows within the irregularities, displaces the moisture and air and inherently bonds thereto. However, in the capacitive components heretofore available, the ceramic surface area beyond the ends of the electrodes remains exposed and retains the air and moisture or is coated with an epoxy which traps the air and moisture such that the electrical field is exposed to ambient air and moisture possessing a low dielectric constant.

The present invention stems from the discovery that premature corona discharge can be overcome by removing the air layer and moisture from the foraminous surface by coating the exposed surfaces with an adsorbent material. The adsorbent material takes up the air and moisture from the irregularities such that the electrical field at the irregularities is no longer exposed to the low dielectric constant of the air and moisture. The adsorbent coating material is preferably composed of particles of a high impedance adsorbent material milled such that the ratio of the surface area to mass is high.

It is therefore the principle object of this invention to provide an improved ceramic-dielectric capacitive component capable of being utilized in high voltage circuits without the premature creation of corona discharge.

Since it is a continuous criterion of design engineers to construct small packages, it is another object of this invention to provide an improved ceramic capacitive component that is compact.

Also, alterations in physical size of the ceramic alter the resonant frequency, and accordingly, it is a further object of this invention to provide an improved ceramic capacitive component that is deresonated through a wide range of very high and ultra-high frequencies.

The foregoing and other objects will appear in the description to follow. In the description, reference is made to the accompanying drawings which form a part hereof and which show by way of illustration specific embodiments in which this invention may be practiced. These embodiments will be described in sufficient detail to enable those skilled in the art to practice this invention, but it is to be understood that other embodiments of the invention may be used and that structural changes may be made in the embodiments described without departing from the scope of the invention. Consequently, the following detailed description is not to be taken in a limiting sense; instead, the scope of the present invention is best defined by the appended claims.

In the drawings:
FIG. 1 is a longitudinal sectional view of a feed-through capacitor embodying the principles of the invention;
FIG. 2 is a transverse sectional view along line 2—2 of the capacitor illustrated in FIG. 1;
FIG. 3 is an enlarged sectional view of a ceramic dielectric fragment illustrating the foraminous surface characteristics of a conventional ceramic dielectric;
FIG. 4 is a longitudinal sectional view of a feed-through filter embodying the principles of this invention; and
FIG. 5 is a transverse sectional view along line 5—5 of the filter illustrated in FIG. 4.

Referring specifically to FIGS. 1 and 2, the principles of this invention may be embodied in a conventional feed-through capacitor, designated generally by the reference character 1. The capacitor 1 is a unitary tubular structure including a threaded cylindrical silver-plated brass body 5 with a machined flange 6. The combination of the flange 6, a nut 7 and a washer 8 provides means for mounting the capacitor 1, to an apertured shielding enclosure 9. A feed-through conductor 10 having a pair of circuit connecting lugs 11 and 12 provides means for circuit connection. Surrounding the feed-through conductor 10 is a tubular dielectric sleeve 13 preferably comprised of a ceramic possessing a high dielectric constant. The sleeve 13 has an internal bore 14 slightly larger than the outer diameter of the conductor 10 to readily accommodate the conductor 10 in accordance with conventional manufacturing tolerance limitations. Adherently disposed on the inner and outer surface of ceramic sleeve 13 are a pair of electrodes 15 and 16. The electrodes 15 and 16 may be comprised of a silver matrix paste and may be plated or fired on the surfaces of the ceramic sleeve 13. The sleeve 13 and the feed-through conductor 10 are held in place by a pair of axially spaced metallic washers or spiders 17 and 18 which are attached to the feed-through conductor 10 by a pair of solder beads 19 and 20, respectively. The washers 17 and 18 are also connected to the electrode 15 by a pair of solder beads 21 and 22, respectively. Electrode 16, commonly referred to as the ground electrode is attached to the brass housing 6 by a pair of solder beads 23 and 24.

The end surfaces of the ceramic sleeve 13 are each coated with a high impedance adsorbent material 25, 26 which also partially overlap the outer electrode 16. The coatings 25 and 26 are disposed such that the entire surface of the ceramic sleeve 13 is covered by either the electrodes 15 and 16 or by the coatings 25 and 26. Completing the structure of the unit and protecting it from moisture, foreign particles, and other rigors of the atmosphere, is an epoxy resin sealer 27 disposed about the outer periphery of the unit 1.

The theoretical operation of the feed-through capacitor 1 is believed to be as hereinafter set forth. The feed-through conductor 10 provides a low impedance path for the direct current and low frequency signals and these signals pass through the conductor 10. However, to high frequency signals the feed-through lead 10 appears as a high inductive reactance. Thus, for all frequencies beyond a certain value the inductive reactance of the inductor 10 exceeds the capacitive reactance path created by the combination of the metallic washers 17 and 18, the electrode 15, the ceramic dielectric 13, the electrode 16, the housing 6, and the shielding enclosure 9. Consequently, the undesired spurious radiation and other interference signals in the very high and ultra-high frequency spectrum find a low impedance path to the shielding 9, while the desired direct current and low frequency signals find a low impedance path along the conductor 10.

As a result of difference in potential between the electrodes 15 and 16, an electrical field is created and exists between the electrodes. Due to edge effect, the electrical field distribution near the ends of the electrodes 15 and 16 has both tangential and radial components. Many of the radial components pass near the foraminous surface of the ceramic sleeve 13 and are subjected to the surface irregularities. In the absence of the coatings 25 and 26, the intensity of the electrical field tends to concentrate at the edges of the irregularities. Furthermore, in the absence of the coatings, the ambient atmosphere includes the air and moisture within the irregularities. Therefore the high density electrical field at the edges of the irregularities prematurely causes a discharge to the low-dielectric-constant ambient air and moisture while the normally-densified field within other parts of the high-dielectric-constant ceramic are far below the discharge point.

FIG. 3 further illustrates the foraminous surface of the ceramic sleeve 13. The drawing shows a magnified cross-sectional view of a fragment 60 of the ceramic sleeve 13 and the electrode 16. The drawing originated from a photomicrograph taken before the coatings 25 and 26 were disposed thereon. The straight unbroken lines 63, 64 and 65 surrounding the drawing on three sides is the boundary lines of the photomicrograph and do not represent a boundary of the fragment 60 itself. It may be noticed that a segment 66 of the electrode 16 adheres to the ceramic surface 62 of a dielectric medium 61 according to the actual contour, such that the air and moisture within the irregularities are displaced. However, in the absence of the coating 25, 26, the surface beyond the end edge of the electrode 16 is exposed such that the air and moisture remain within the irregularities and the electrical field concentrates at the sharp edges.

Incorporation of an adsorbent material as taught by the present invention results in the removal of the air and moisture from the irregular surface. Thus, the highly concentrated electrical field at the sharp edges of the irregularities is not exposed to the low-dielectric-constant ambient surroundings and accordingly, the electric field may become of a substantially higher magnitude before a discharge takes place. By removal of the air and moisture, the applicability and reliability of the unit is improved such that it is better adapted for use in present-day high-voltage circuitry.

The depth of the coatings 25 and 26 is not critical. However, it need be realized that besides the electrical field components proximate to the surface of the dielectric sleeve 13, there are electrical field components passing outside the ceramic sleve. Depending on their distance from the ceramic sleeve, the outer components pass through either the adsorbent coating or the sealer material 27. Also, there may be air voids within the sealer material 27 and though the intensity of the field components passing outside the ceramic sleeve 13 decreases as the distance from the ceramic increases, when subjected to air or moisture the field may be of sufficient magnitude to cause a premature creation of corona discharge. Consequently, the coatings 25 and 26 need be of sufficient depth so that if air voids exist within the sealer 17, the magnitude of the field will not cause detrimental corona discharge. Though by no means exclusive, coatings of a depth equal to or greater than the depth of the electrodes 15 and 16 are generally satisfactory.

One limitation on the coating material arises from the fact that due to the difference in potential between the opposing electrodes, the composition of the material must be such that a high impedance is retained between the electrodes. Secondly, the degree of improvement in high voltage performanace of the capacitive unit is dependent upon the adsorbent qualities of the coating material which, besides the crystal structure, is dependent on the ratio of the surface area to mass of the particles. We have found that as a general rule, coatings comprising a non-conductive vehicle having dispersed therein finely milled particles of adsorbent semi-conductive or insulating materials milled such that the resulting powder has a consistency similar to that of talcum powder, or more specifically a particle size of approximately five microns, provide very favorable results in removing the air and moisture and reatining a high impedance between the electrodes. For example, a standard model bolt-mounted tubular ceramic feed-through capacitor utilizing conventional construction with exposed surfaces about the ends of the ceramic tube has a corona discharge voltage of 3.0 kilovolts. The value was increased to 6.0 kilovolts by coating the exposed surfaces with a mixture comprising approximately 98% by volume of cellulose acetate and approximately 2% by volume of carbon black. Likewise, a mixture of approximately 5% by volume of barium titanate disposed with approximately 95% by volume of cellulose acetate produces similar results. Numerous other finely milled adsorbents may be used, illustartive of which are varnishes, lacquers and paints.

Referring to the details of FIGS. 4 and 5, the principles of this invention are shown incorporated in a capacitive feed-through filter. Like in the feed-through capacitor art, dielectrics are popular in the feed-through filter art. Likewise, the high voltage reliability and applicability of ceramic-dielectric feed-through filters heretofore available have been limited by premature corona discharge resulting from the exposed surfaces about the ends of the electrodes. Furthermore, there are many conventional filters utilizing a plurality of spaced electrodes on one surface and a common electrode on the opposite surface witih the area between the spaced electrodes exposed. Therefore, due to the air and moisture within the surface irregularities between the spaced electrodes and the exposed surface areas about the ends of the ceramic, the filter is further subjected to the premature creation of corona discharge. By incorporating the principles of this invention and applying a high impedance adsorbent coating comprised of finely milled particles between the spaced electrodes and about the end surfaces of the ceramic, the detrimental low voltage characteristics are overcome as they are in the feed-through capacitor.

FIGS. 4 and 5, respectively, show a longitudinal sectional and transverse sectional view of a feed-through filter designated generally by the reference character 30. The filter 30 is mounted in an aperture 31 of a shielding enclosure 32. The filter is mechanically and electrically mounted by the combination of a washer 33 and a nut 34 which fasten to a threaded brass housing 35 of the unit 30. A feed-through conductor 36 is provided with a pair of lugs 37 for circuit connection.

Beginning at the feed-through conductor 36, it may be seen that the conductor is surrounded by a cylindrical sleeve 38 comprised of a ferri-magnetic material. The ferri-magnetic sleeve 38 has an internal bore 39 slightly larger than the outer diameter of the conductor 36 to readily accommodate the conductor 36 in accordance with conventional manufacturing tolerance limitations. Surrounding the sleeve 38 is a tubular ceramic sleeve 40 preferably comprised of a ceramic possessing a high dielectric constant. The aforementioned tubular sleeves 38 and 40, and the feed-through conductor 36 are maintained in fixed relationship by a pair of axially spaced metallic washers or spiders 41 and 42. The feed-through conductor 36 is secured mechanically and electrically to each of the washers or spiders 41 and 42 by a pair of solder connections 43 and 44, respectively.

The capacitor elements are formed on the inner and outer surfaces of the ceramic sleeve 40 by an electrode 45 disposed on the outer surface and by a pair of electrodes 46 and 47 disposed on the inner surface. All electrodes are preferably comprised of a glass matrix silver paste. The paste is adherently applied, by firing or plating, to the sleeve 40 with the inner electrodes 46 and 47 spaced so as to leave a portion of the sleeve 40 exposed. The electrode 45 is electrically and mechanically connected to the internal surfaces of the housing 35 by a pair of metallic beads 48 and 49 preferably comprised of a curable conducting epoxy. The ferrite sleeve 38 is in inductive relationship to the spacing between the electrodes 46 and 47. The washers 41 and 42 are respectively joined to the electrodes 46 and 47 by a pair of solder beads 55 and 56.

As previously described in connection with the feed-through capacitor 1 illustrated in FIGS. 1, 2 and 3, the electrical field proximate to the ends of the electrodes 45, 46 and 47 contains both radial and tangential components. In the absence of an adsorbent coating, the field is exposed to the air and moisture within the irregularities, thereby resulting in premature creation of corona discharge. However, in the present invention an adsorbent coating 50, similar to that previously described in connection with the coatings 25 and 26 of FIGS. 1 and 2 is disposed about the end surface of the sleeve 40 common to the electrodes 45 and 46. Likewise, a coating 51, similar to the coating 50, is disposed about the end surface common to the electrodes 45 and 47. The adsorbent coatings 50 and 51 displaces the air and moisture from the irregularities and removes it from the strong components of the electrical field.

It may also be noticed that inner electrodes 46 and 47 are connected by a semi-conductive or insulating adsorbent material 52 adherently disposed on the ceramic sleeve 40. Due to edge effect and the fact that the electrode 45 is common to both of the spaced electrodes 46 and 47, the electrical field within the spacing between the electrodes 46 and 47 and passing from the common electrode 45 to the electrodes 46 and 47 is non-uniform and concentrates at the inner edges 53 and 54 of the electrodes 46 and 47. In the absence of the adsorbent coating 52, the high concentration of the field makes the unit susceptive to the premature creation of corona discharge. Furthermore, due to the air and moisture within the irregularities of the surface between the electrodes 46 and 47 and the fact that the air and moisture is acted upon by the highly concentrated field, the unit is further susceptible to premature corona discharge. By incorporating a coating 52 comprised of an adsorbent material similar to that of the coatings 50 and 51, the air and moisture are displaced from the irregularities and premature corona discharge averted.

The feed-through capacitor and filter embodiments contained herein are set forth to be merely illustrative and not to be taken in a limiting sense. The principles of this invention may be incorporated in many different embodiments according to specific needs and desires. Accordingly, the invention should be construed by the scope of the claims rather than by the embodiments selected for illustrative purposes.

We claim:
1. In an electrical capacitive component for use in very high and ultra-high freqeuncy electronic circuitry and comprising a ceramic dielectric having a microscopically foraminous, irregular surface subject to penetration by moisture and gases within the irregularities of the surface and a plurality of electrodes intimately disposed over portions of said surface, the combination with a coating adherently disposed on said foraminous surface between said electrodes, said coating comprising a nonconductive vehicle having dispersed therein finely milled particles of a high impedance adsorbent material capable of adsorbing the moisture and gases from the irregularities of the surface.

2. An electrical component in accordance with claim 1 in which the coating material comprises a vehicle having dispersed therein finely milled particles of a high impedance adsorbent material, with the dimensions of said particles being approximately five microns.

3. An electrical component in accordance with claim 1 in which the coating material comprises a mixture of carbon black in cellulose acetate.

4. An electrical component in accordance with claim 3 in which the composition ratio of the coating material is approximately 2% by volume of carbon black and approximately 98% by volume of cellulose acetate.

5. An electrical component in accordance with claim 1 in which the coating material comprises a mixture barium titanate in cellulose acetate.

6. An electrical component in accordance with claim 5 in which the composition ratio of the coating material is approximately 5% by volume of barium titanate and approximately 95% by volume of cellulose acetate.

7. In a feed-through capacitor for use in very high and ultra-high frequency electronic circuitry and comprising a ceramic dielectric having microscopically foraminous irregular surfaces subject to penetration by moisture and gases within the irregularities of the surfaces, with a first metallic electrode disposed on a first surface of said dielectric, and a second metallic electrode disposed on a second surface of said dielectric and in capacitive relationship with said electrode disposed on said first surface: the combination with a coating material adherently disposed on said foraminous surface areas of said ceramic between said first and second electrodes, said coating making contact with said electrodes and comprising a non-conductive vehicle having dispersed therein finely milled particles of a high impedance adsorbent material capable of adsorbing the moisture and gases from the irregularities of the surfaces.

8. In a feed-through filter for use in very high and ultra-high frequency electronic circuitry and comprising a ceramic dielectric having microscopically foraminous, irregular surfaces subject to penetration by moisture and gases within the irregularities of the surfaces, with at least one metallic electrode disposed on a first surface of said dielectric, and a plurality of spaced electrodes disposed on a second surface of said ceramic and in capacitive relationship with said electrode disposed on said first surface with said spaced electrodes being spaced to leave a portion of said second surface exposed: the combination with a coating material adherently disposed on said foraminous surface between the electrodes on said first and second surface and on said exposed portion of said second surface, said coating making contact with said electrodes and comprising a non-conductive vehicle having dispersed therein finely milled particles of a high impedance adsorbent material capable of adsorbing the moisture and gases from the irregularities of the surfaces.

References Cited by the Examiner

UNITED STATES PATENTS

| | | | |
|---|---|---|---|
| 2,789,154 | 4/1957 | Peterson | 174—127 |
| 2,983,855 | 5/1961 | Schlicke | 317—242 |
| 3,035,237 | 5/1962 | Schlicke | 317—242 |

FOREIGN PATENTS 747,637  4/1956  Great Britain.

OTHER REFERENCES

Corona Properties of Insulating Materials, reprint from Electrical Manufacturing, June 1956, pp. 132–139.

Birks, Modern Dielectric Materials, Heywood & Co. Ltd., London, 1960, pp. 87–88, 122–125, 168 relied on.

ROBERT K. SCHAEFER, *Primary Examiner.*

JOHN F. BURNS, *Examiner.*

J. D. BADER, *Assistant Examiner.*